US 6,748,059 B2
Jun. 8, 2004

(12) United States Patent
Das et al.

(54) APPARATUS AND METHOD FOR UNIFIED TONE DETECTION

(75) Inventors: Sharmistha Sarkar Das, Broomfield, CO (US); Manish Marwah, Boulder, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 112 days.

(21) Appl. No.: 10/117,021

(22) Filed: Apr. 5, 2002

(65) Prior Publication Data
US 2003/0076943 A1 Apr. 24, 2003

Related U.S. Application Data
(60) Provisional application No. 60/345,026, filed on Oct. 23, 2001.

(51) Int. Cl.[7] .............................................. H04M 11/00
(52) U.S. Cl. ............................ 379/100.14; 379/355.01; 379/373.07
(58) Field of Search ....................... 379/201.01, 100.14, 379/355.01, 286, 112, 97, 98, 99, 418, 457, 386

(56) References Cited

U.S. PATENT DOCUMENTS

| 5,493,616 | A | * | 2/1996 | Iidaka et al. ................. 381/71 |
| 5,521,967 | A | * | 5/1996 | Novas et al. ................. 379/100 |
| 5,719,932 | A | * | 2/1998 | Roybal ........................ 379/386 |
| 6,553,965 | B2 | * | 4/2003 | Umemoto .................. 123/406.6 |

* cited by examiner

Primary Examiner—Creighton Smith
(74) Attorney, Agent, or Firm—John C. Moran

(57) ABSTRACT

Performing tone detection by (1) creating a search engine for every period of all possible tones, (2) applying the search engines on one period of the unknown tone, (3) eliminating the search engines that did not match the period of the unknown tone, (4) reapplying the remaining search engines, and (5) repeating (3) and (4) until the unknown tone can be identified as one of the possible tones based on the remaining search engines.

17 Claims, 5 Drawing Sheets

APPARATUS AND METHOD FOR UNIFIED TONE DETECTION

CROSS-REFERENCE TO RELATED APPLICATIONS

Priority benefits are claimed under Title 35, United States Code, 119(e) on the basis of U.S. Provisional Patent Application Serial No. 60/345,026 filed on Oct. 23, 2001.

TECHNICAL FIELD

This invention relates to telecommunication systems in general, and in particular, to the capability of doing call classification.

BACKGROUND OF THE INVENTION

Call classification is the ability of a telecommunication system to determine how a telephone call has been terminated at a called end point. An example of a termination signal that is received back for call classification purposes is a busy signal that is transmitted to the calling party upon the called party being engaged in a telephone call. Another example is a intercept tone that is transmitted to the calling party by the telecommunication switching system if the calling party has made a mistake in dialing the called party. Another example of a tone that has been used within the telecommunication network to indicate that a voice message will be played to the calling party is a special information tone (SIT) that is transmitted to the calling party before a recorded voice message is sent to the calling party.

Call classification is used in conjunction with different types of services. For example, outbound-call-management, coverage of calls redirected off the net (CCRON), and call detail recording are services that require accurate call classification. Outbound-call management is concerned with when to add an agent to a call that has automatically been placed by an automatic call distribution center (also referred to as a telemarketing center) using predictive dialing. Predictive dialing is a method by which the automatic call distribution center automatically places a call to a telephone before an agent is assigned to handle that call. The accurate determination if a person has answered a telephone versus an answering machine or some other mechanism is important because the primary cost in an automatic call distribution center is the cost of the agents. Call detail recording is concerned with the accurate determination of whether a call has been completed to a person. This is important in many industries. An example of such an industry is the hotel/motel particularly where the hotel/motel applications are utilizing analog trunks to the switching network that do not provide answer supervision. It is necessary to accurately determine whether or not the call was completed to a person or a network message so as to accurately bill the user of the service within the hotel. Call detailed recording is also concerned with the determination of different statuses of call termination such as hold status (e.g. music on hold), fax and/or modem tone. An example of CCRON is its utilization by an in-call coverage feature on an enterprise switching system where the feature transfers an incoming call destined for a user's desk telephone to the user's cellular telephone.

As can be seen from the following, the accurate and rapid detection of tones is important to outbound-call-management, CCRON, and call detailed recording services. Prior art tone detection solutions have relied on the detection of only frequencies for tones such as facsimile tones, modem tones, touch tone dialing (DTMF), etc. and the use of cadence detection for tones such as busy tone, fast busy, etc. The detection of cadences has been done by detecting sequences of energy and silent periods. Many tones such as busy tones have a sequence of energy and silence periods. For tones such as busy tones, this sequence of energy and silence periods may vary by country. Unfortunately, prior art techniques of cadence detection has required that there be an equal number of energy and silence periods in number, and these periods must alternate. Further, the cadence must end in a silence period. Further, other tones such as SIT and modem/fax tones can not be recognized using the cadence technique. Rather, a separate frequency detector must be utilized to recognize these tones.

SUMMARY OF THE INVENTION

This invention is directed to solving these and other problems and disadvantages of the prior art. According to an embodiment of the invention, an apparatus and method perform tone detection by (1) creating a search engine for every period of all possible tones, (2) applying the search engines on one period of the unknown tone, (3) eliminating the search engines that did not match the period of the unknown tone, (4) reapplying the remaining search engines, and (5) repeating (3) and (4) until the unknown tone can be identified as one of the possible tones based on the remaining search engines.

DETAILED DESCRIPTION

Figure 1:
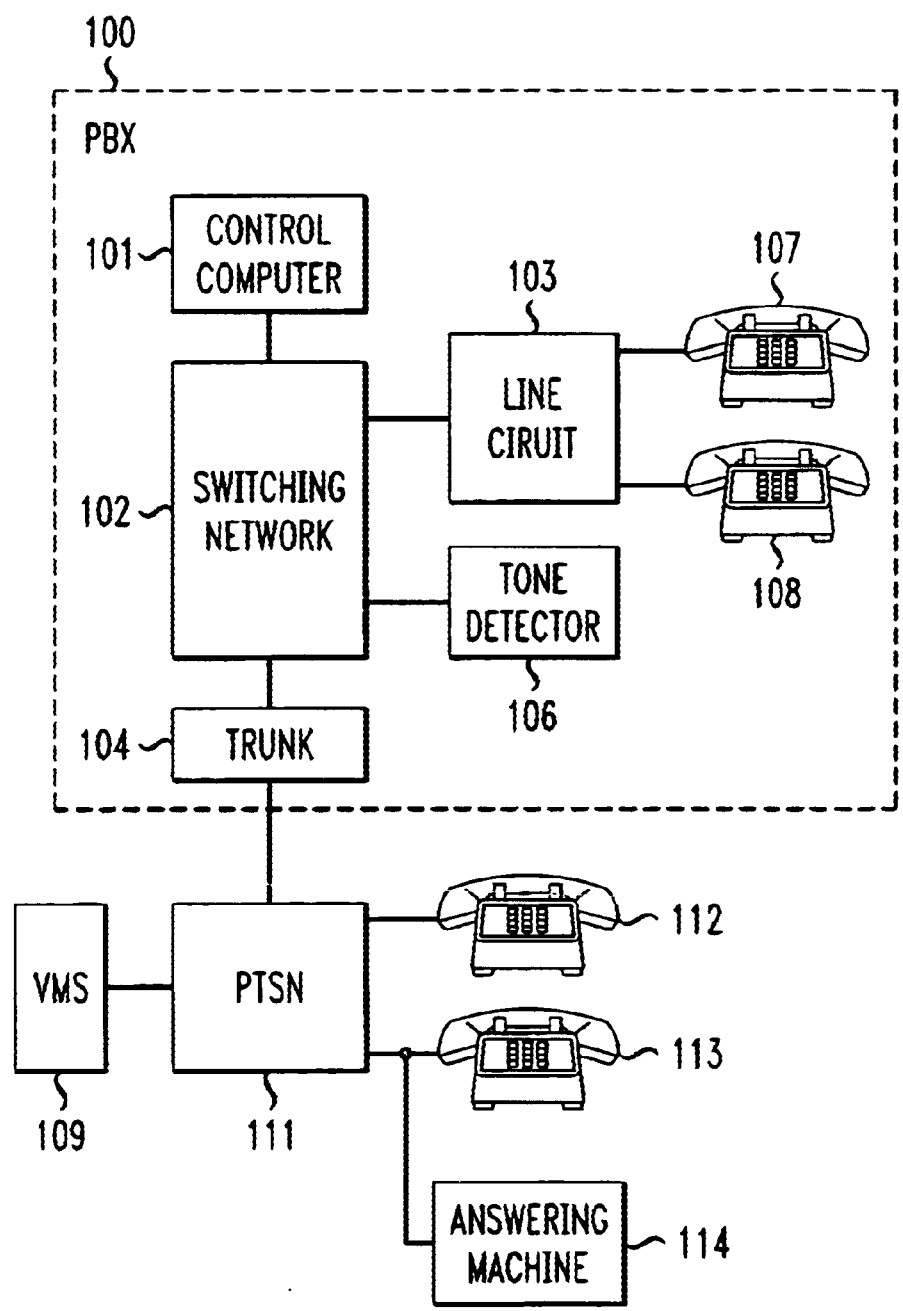
FIG. 1 illustrates an embodiment for utilizing the invention.

FIG. 1 illustrates an embodiment of a system that utilizes an embodiment of a tone detector in accordance with the invention. In FIG. 1, control computer 101 utilizes tone detector 106 to perform call classification for such types of service as outbound-call-management, coverage of calls redirected off the net, and call detailed recording. One skilled in the art would readily realize that control computer 101 could utilize tone detector 106 for other types of call classification operations. Further, one skilled in the art would readily realize that embodiments of tone detector 106 could also be utilized within voice message system (VMS) 109 and public telephone switching network (PTSN) 111. In addition, one skilled in the art would realize that tone detector 106 could also be utilized in various types of digital telephony systems.

Consider the following example of the utilization by control computer 101 of tone detector 106. Assume that telephone set 108 places a call to telephone 113 via line circuit 103, switching network 102, trunk 104, and PTSN 111. When the call is initially placed by telephone set 108, control computer 101 bridges tone detector 106 on to this call via switching network 102. Control computer 101 also initiates the operation of tone detector 106 on this call. The call may be terminated on telephone set 113, answering machine 114 or VMS 109. Tone detector 106 transmits a message to control computer 101 informing control computer 101 of the entity on which the call was terminated. In addition, if the user of telephone set 108 misdialed, PTSN may transmit a intercept tone.

Figure 2:
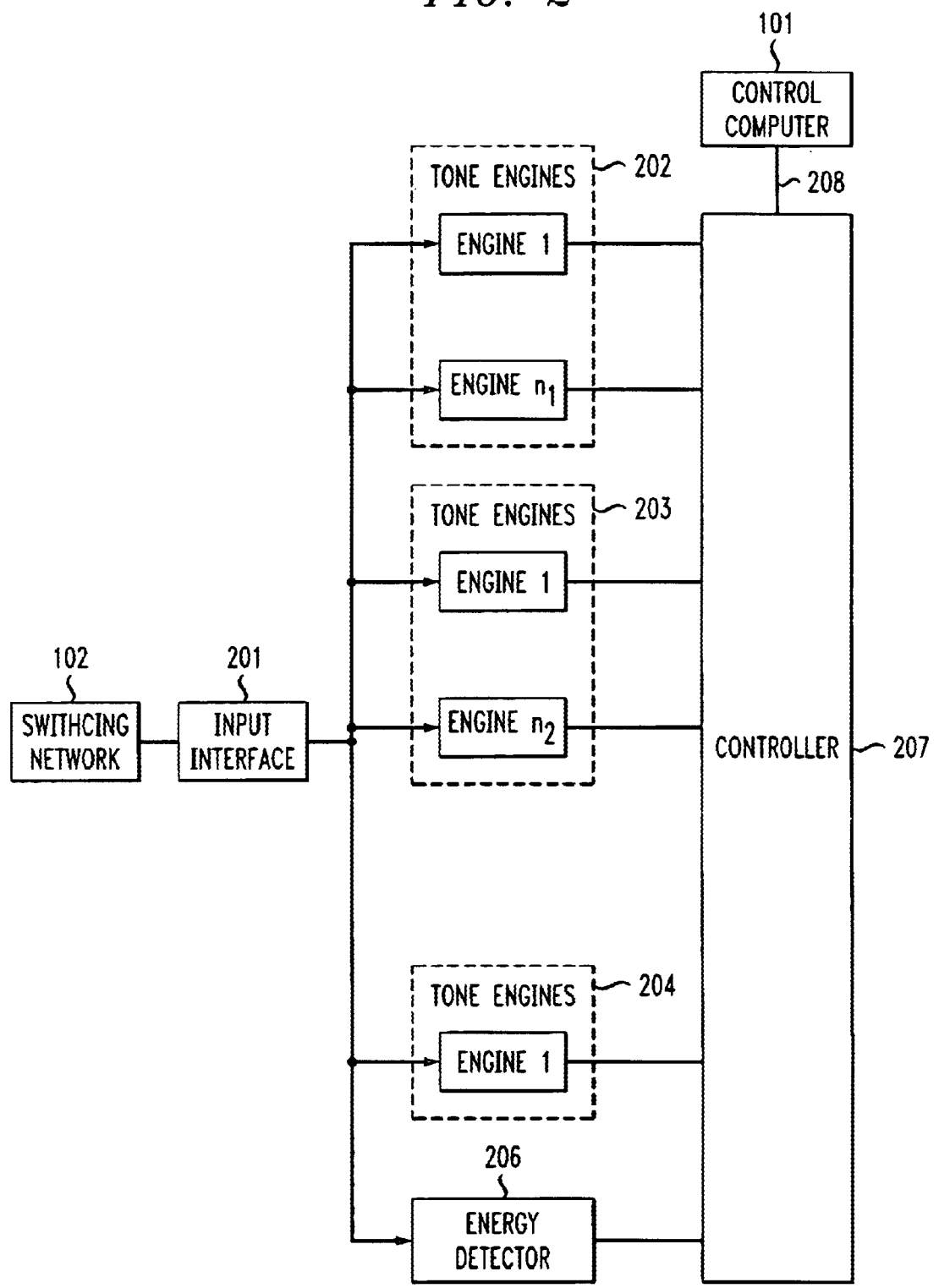
FIG. 2 illustrates, in block diagram form, an embodiment of the invention.

One embodiment of a tone detector, in accordance with the invention, is illustrated in FIG. 2. For each tone that detector 106 is to detect, there is a set of tone engines. These are designated in FIG. 2 as tone engines 202 through tone engines 204. As will be explained below by way of an example, there is one engine for each period of the tone that is being detected. Where a period is defined as a non-repeating and complete time interval of energy or silence. Each interval of energy or silence is considered as a separate energy state. Hence, a tone such as the tone illustrated on line 302 of FIG. 3 has two periods. Within a tone engines block, there can be from one tone engine to n tone engines to perform the operations of detecting for a tone. For a given tone, "n" is equal to the number of periods in the tone. A tone engine block that consists of only one tone engine would be one that would detect tones that are non-repetitive in operation. An example of such a tone is a SIT tone that has different frequencies within one energy state.

When controller 207 receives a message from control computer 101 via link 208 to start detecting for a tone, it utilizes energy detector 206 to determine a transition between low and high energy of the information being received from switching network 102 via input interface 201. When such a transition is detected, controller 207 initiates the operations of all engines in tone engines 202–204. Within each of the tone engines blocks, each engine is attempting to match the incoming signal being received from input interface 201 to the cadence and frequency of a particular part of a tone. When energy detector 206 determines that another transition has occurred, controller 207 polls each engine to determine if a valid match has been determined. Any engine that has not found a valid match is disabled. The remaining engines then attempt to find a match for the next period. Not only are the engines illustrated in tone engines 202–204 matching for sequences of periods to determine cadence but they may also be detecting for frequencies within the periods containing energy. In addition to performing matching, the engines may also as described with respect to FIG. 7 be computing a value that defines the goodness of the fit of the match to each period. Tone engines 202–204 may be implemented as hardware devices by using wired logic or programmable logic arrays or by programming one or more programmable processors to perform the functions of the tone engines. Further, the programmable processors may general purpose processors, digital signal processors (DSP) or other well known processors. These programmable processors may be programmed in a number of well known software programming languages.

Figure 3:
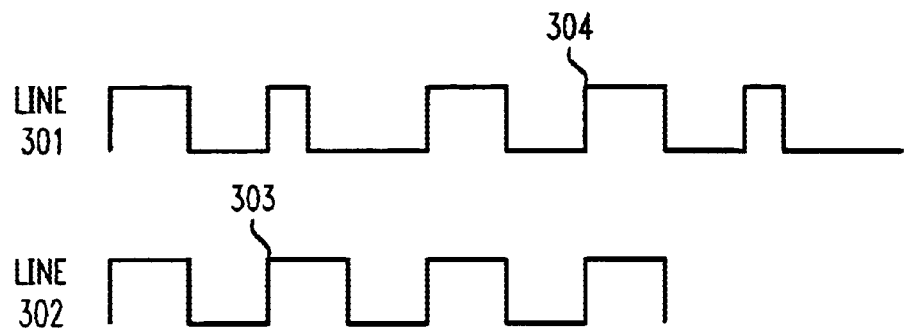
FIG. 3 illustrates an example of two tones.
Figure 4:
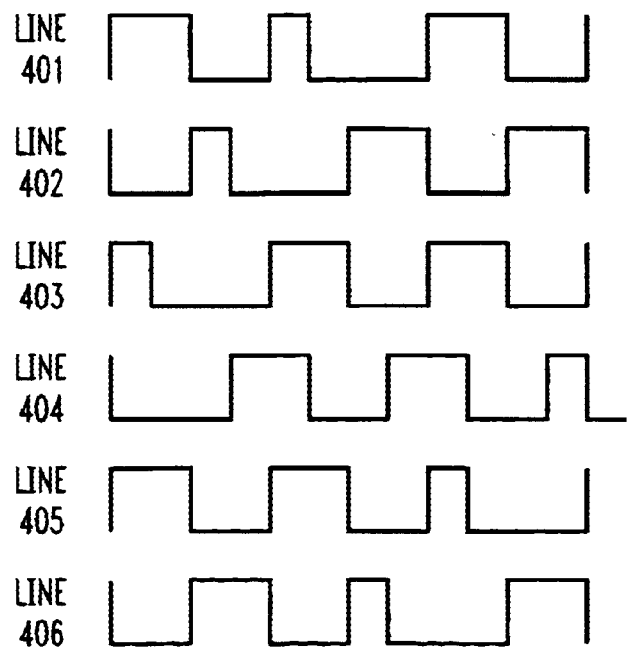
FIGS. 4 and 5 illustrate the pattern detection of engines for the tones of FIG. 3.
Figure 5:
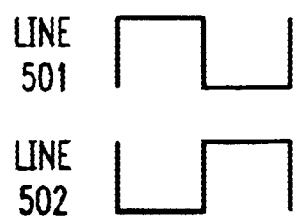

By way of an example consider FIGS. 3–5, these figures are used to illustrate an example of tone detector 106 of FIG. 1 that could detect two different tones as illustrated in FIG. 3. Line 301 of FIG. 3 illustrates the cadence of one tone, and line 302 indicates the cadence of another tone. The energy periods could also be distinguished by having different frequencies although this example does not describe such energy periods. The sequences of periods illustrated in FIG. 4 define the operations of engines in an embodiment of tone detector 106 that detects the tone of line 301. Each line of FIG. 4 illustrates a sequence of periods that one engine will attempt to match for an unknown tone to determine if the unknown tone is the tone illustrated in line 301 of FIG. 3. In order to detect the tone of line 301, it is necessary to have six engines in a tone engine block of tone engines 202 of FIG. 2 for the tone of line 301. The reason is that there are six periods from the start of line 301 to the end of the non-repeating portion of line 301. The start of repeating portion is designated by 304 in FIG. 3.

By the same token, the tone engines block for a tone as illustrated in line 302 requires only two engines as is illustrated in FIG. 5. The reason is that there are only two periods in line 302 before it repeats as is illustrated by point 303 of FIG. 3.

Figure 6:
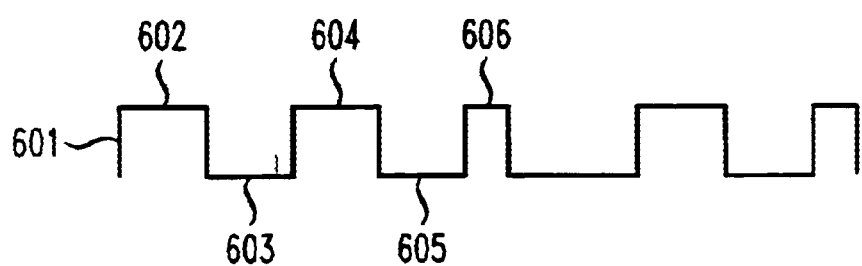
FIG. 6 illustrates an example of a tone to be detected.

To illustrate the operation of such a tone detector based on the engines illustrated in FIGS. 4 and 5, consider the input signal illustrated in FIG. 6. When controller 207 detects via energy detector 206 the transition point 601 of FIG. 6, controller 207 initiates all of the engines. During the first period of high energy as denoted by 602, the engines illustrated by lines 401 and 405 of FIG. 4 as well as line 501 of FIG. 5 determine matches. In response, controller 207 disables the remaining engines. During the low energy period 603, the engines illustrated by lines 401, 405, and 501 also determine matches. During high energy period 604, the engine associated with line 401 will not determine a match; however, the engines illustrated by lines 405 and 501 do. In response, controller 207 disables the engine associated with line 401. During the low energy period 605, the engines illustrated by lines 405 and 501 determine matches, and controller 207 allows these two engines to remain active. However, during the high energy period 606, only the engine associated with line 405 determines a match. In response to only one engine determining a match, controller 207 transmits to control computer 101 a message indicating that the tone has been determined to be that of line 301 of FIG. 3.

During a period of high or low energy, it is possible to encounter noise. Controller 207 utilizes energy detector 206 to determine noise which is defined as a predetermined percentage of a given period. Upon determining that noise is present, controller 207 instructs the engines of tone engines 202–204 to ignore the portion of time that the noise is present.

In addition, to the presence of noise in an audio stream in which detector is attempting to detect a tone, the tone itself may not be precisely at its designated period and frequencies. These two factors could cause an engine to determine that it was not matching a tone whereas in reality it was a tone that should have been matched by that particular engine. To overcome this problem of imprecision with respect to frequency and duration of a period, the engines do not transmit to controller 207 a simple match or no match rather, the engines transmit to controller 207 a goodness of fit value which is maintained during the operation of the detector as a sum for each valid engine. Advantageously, the goodness of fit value may be the square of the Euclidean distance between the designated period and that which is received by the engine from input interface 201. If after a sufficient number of periods have been analyzed and there are still two or more engines indicating matches, controller 207 utilizes the engine having the best sum of goodness fit values as indicating the correct tone. The sufficient number of matches is computed theoretically based on the number of periods of all of the tones that have valid engines associated with them.

Figure 7:
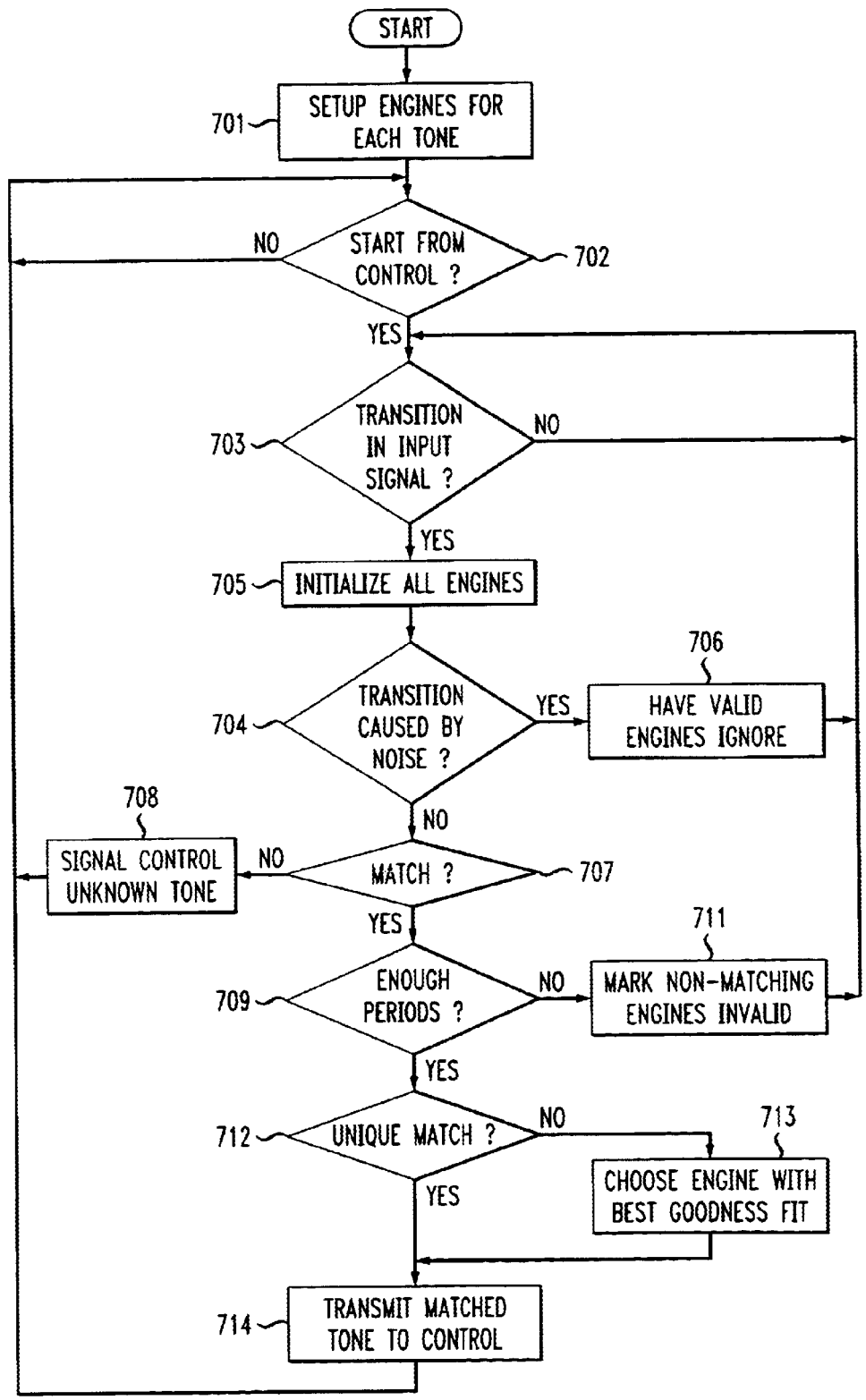
FIG. 7 illustrates, in flow chart form, steps of one embodiment of the invention.

FIG. 7 illustrates a more general embodiment of a tone detector, in accordance with the invention, of the tone detector illustrated in FIG. 2. After the detector is started, block 701 sets up the engines for each of the tone engines blocks. After this is accomplished, decision block 702 waits for a start signal from the control entity. In the case of FIG. 1, this control entity is control computer 101. If a control signal is not received, decision block 702 is re-executed. If the control signal is received from the control, block 705 initializes all of the engines of FIG. 2 to be prepared to start pattern matching on periods.

Decision block 703 then determines when a transition has occurred in the input signal. After a transition has occurred, decision block 704 determines if this transition was caused by noise. If the answer is yes, block 706 instructs all of the valid engines to ignore the noise and proceed with the matching for the present period. Control is transferred back to decision block 703 from block 706. If the transition was not caused by noise, control is transferred to decision block 707 which determines if any of the engines have determined a match. If the answer is no, control is transferred to block 708 which signals the control that the tone is unknown before transferring control back to decision block 702. If the answer in decision block 707 is yes, decision block 709 determines if enough periods have been analyzed. Decision block 709 makes the determination if a sufficient number of periods have been analyzed. As would be obvious to one skilled in the art, this determination of the sufficient number of periods is made by requiring that the sufficient number of periods be equal to a predefined number multiplied times the maximum number of periods required by any tone. Where, the predefined number would be in a range of 2 to 6. If the answer in decision block 709 is no, block 711 marks the non-matching engines as invalid by informing them to stop the matching process and transfers control back to decision block 703. If the answer in decision block 709 is yes, decision block 712 determines if only one engine is indicating a match. If the answer is no meaning that there are more than one engine indicating a match after sufficient periods have been analyzed, block 713 chooses the engine which has the best goodness fit, and the identification of the associated tone is transmitted to the control by block 714. If the answer in decision block 712 is yes, the unique engine that found a match has its tone designation transmitted to the control by block 714. After transmission of the determined tone designation to the control, block 714 transfers control back to decision block 702. The blocks illustrated in FIG. 7 may be performed in a different order or may be performed in parallel.

Of course, various changes and modifications to the illustrative embodiment described above will be apparent to those skilled in the art. Such changes and modifications can be made without departing from the spirit and scope of the invention and without diminishing its intended advantages. It is therefore intended that such changes and modifications be covered by the following claims except in so far as limited by the prior art.

What is claimed is:

1. A method for detecting a received tone in response to input information defining the received tone, comprising the steps of:
    (a) determining for each of all possible tones all sequences of each of all possible tones;
    (b) comparing all sequences of all possible tones with a portion of the input information by generating a goodness of fit value wherein the goodness of fit value defines how good the comparison is with the input information;
    (c) determining a subset of sequences that match the input information where all other sequences of all possible tones did not match the input information;
    (d) comparing sequences of the subset with another portion of the input information;
    (e) determining a new subset of sequences that match the input information where all other sequences of the subset did not match the input information;
    (f) repeating steps (d) and (e) by substituting the new subset for the subset of step (d) until a sufficient amount of the input information has been processed; and
    (g) identifying the received tone as being one of the possible tones.

2. The method of claim 1 wherein the step of repeating further comprises the step of transferring to step (g) if the new subset only contains sequences of one of the possible tones.

3. The method of claim 1 wherein the step of repeating further comprises the step transferring to step (g) if steps (d) and (e) have been repeated a number of times wherein the number is calculated from a sequence of one of the possible tones.

4. The method of claim 1 wherein all sequences of the possible tones comprise time intervals of energy and non-energy.

5. The method of claim 4 wherein the energy time intervals of a particular sequence can comprise different frequencies; and
    the step of comparing further comprises the step of comparing the frequency of each time interval of the particular sequence with frequencies in the input information.

6. The method of claim 4 wherein the step of comparing further comprises the step of comparing the time intervals of energy and non-energy in the sequences of the possible tones with time intervals of energy and non-energy in the input information.

7. The method of claim 6 wherein the step of comparing the time intervals of energy and non-energy in the sequences of the possible tones with time intervals of energy and non-energy in the input information further comprises matching frequencies of the time interval of energy of the sequences of the possible tones with frequencies of time intervals of energy in the input information.

8. The method of claim 1 wherein the step of generating the goodness index comprises the step of summing the goodness of fit values for all comparison operation for each sequence.

9. The method of claim 8 wherein the step of generating the goodness of fit value each sequences comprises the step of calculating a square of the Euclidean distance between the a time interval of the input information and a time interval of each sequences.

10. An apparatus for classifying a received signal representing a received tone, comprising:
    a plurality of tone engines with a subset of the plurality of tone engines corresponding to each of the possible tones with each of the subset of the plurality of tone engines capable of detecting a starting point of a unknown tone corresponding to each of the possible tones;
    each of the plurality of tone engines comparing with sequential time intervals of the received signal by each of the tone engines generating a goodness of fit value wherein the goodness of fit value defines how good the comparison is with the sequential time intervals and generating a match or non-match signal; and
    a controller responsive to matches from ones of the subsets having tone engines generating match signals for the sequence of time intervals of the received signal for identifying the received signal as being one of the possible tones.

11. The apparatus of claim 10 wherein the controller further responsive to matches from ones of the subsets having tone engines generating match signals for identifying a one of the possible tones upon only tone engines corresponding to the one of the possible tones generating match signals.

12. The apparatus of claim 10 wherein in each of the tone engines compares for a pattern of energy and non-energy in the time intervals of the sequential time intervals of the received signal.

13. The apparatus of claim 10 wherein in each of the tone engines compares for frequencies in the sequential time intervals of the received signal.

14. The apparatus of claim 10 wherein in each of the tone engines compares for frequencies and a pattern of energy and non-energy in the sequential time intervals of the received signal.

15. The apparatus of claim 10 wherein in each of the tone engines sums the goodness of fit values for all comparison operations made with the sequential time intervals.

16. The apparatus of claim 10 wherein each of the tone engines generating the goodness of fit value for each sequences by calculating a square of the Euclidean distance between a time interval of the sequential time intervals and that expected by each of the tone engines.

17. An apparatus for identifying a received tone signal, comprising:

means for comparing time intervals of the received tone signal with patterns of possible tones wherein a pattern is used for each starting point of each non-repetitive time intervals of each of the possible tones by generating a goodness of fit value wherein the goodness of fit value defines how good the comparison was with the received tone signal;

means for generating a match signal for each of the patterns of the possible tones for which one of the time intervals of the received tone signal; and means for designating the received tone signal as being one of the possible tones in response to match signals generated by the means for generating for patterns of the one of the possible tones.

* * * * *